(12) United States Patent
Patton et al.

(10) Patent No.: US 11,105,666 B2
(45) Date of Patent: Aug. 31, 2021

(54) MASS FLOWMETER USING THERMAL DISPERSION TECHNOLOGY

(71) Applicant: FLUID COMPONENTS INTERNATIONAL LLC, San Marcos, CA (US)

(72) Inventors: James Scott Patton, Los Osos, CA (US); Michael Bess, San Marcos, CA (US); Dang Le, Carlsbad, CA (US); Jack Barnett, Carlsbad, CA (US); Mark Oberman, Del Mar, CA (US); Eric Wible, Carlsbad, CA (US)

(73) Assignee: FLUID COMPONENTS INTERNATIONAL LLC, San Marcos, CA (US)

( * ) Notice: Subject to any disclaimer, the term of this patent is extended or adjusted under 35 U.S.C. 154(b) by 118 days.

(21) Appl. No.: 16/360,968

(22) Filed: Mar. 21, 2019

(65) Prior Publication Data
US 2019/0219431 A1 Jul. 18, 2019

Related U.S. Application Data

(63) Continuation of application No. PCT/US2017/052809, filed on Sep. 21, 2017.

(60) Provisional application No. 62/397,787, filed on Sep. 21, 2016.

(51) Int. Cl.
*G01F 1/699* (2006.01)
*G01F 1/696* (2006.01)
*G01F 7/00* (2006.01)
*G01F 1/69* (2006.01)

(52) U.S. Cl.
CPC ............ *G01F 1/699* (2013.01); *G01F 1/69* (2013.01); *G01F 1/696* (2013.01); *G01F 7/00* (2013.01)

(58) Field of Classification Search
CPC . G01F 1/699; G01F 1/696; G01F 7/00; G01F 1/69; G01F 1/698
See application file for complete search history.

(56) References Cited

U.S. PATENT DOCUMENTS

| | | | |
|---|---|---|---|
| 5,212,983 A * | 5/1993 | Ott | G01F 1/6842 73/204.14 |
| 5,339,687 A | 8/1994 | Gimson et al. | |
| 5,493,100 A | 2/1996 | Renger | |
| 7,191,645 B2 | 3/2007 | Wible | |

OTHER PUBLICATIONS

Search Report, PCT/US2017/052809, dated Sep. 21, 2017 (4 pages).

* cited by examiner

*Primary Examiner* — Benjamin R Schmitt
(74) *Attorney, Agent, or Firm* — The Maxham Firm; Lawrence A. Maxham

(57) ABSTRACT

A mass flowmeter employing thermal dispersion technology, and method for determining mass flow of a fluid throughout a range beyond that which possible for a constant ΔT instrument at increasing power, and below that with which a constant power instrument can provide rapid ΔT readings.

4 Claims, 23 Drawing Sheets

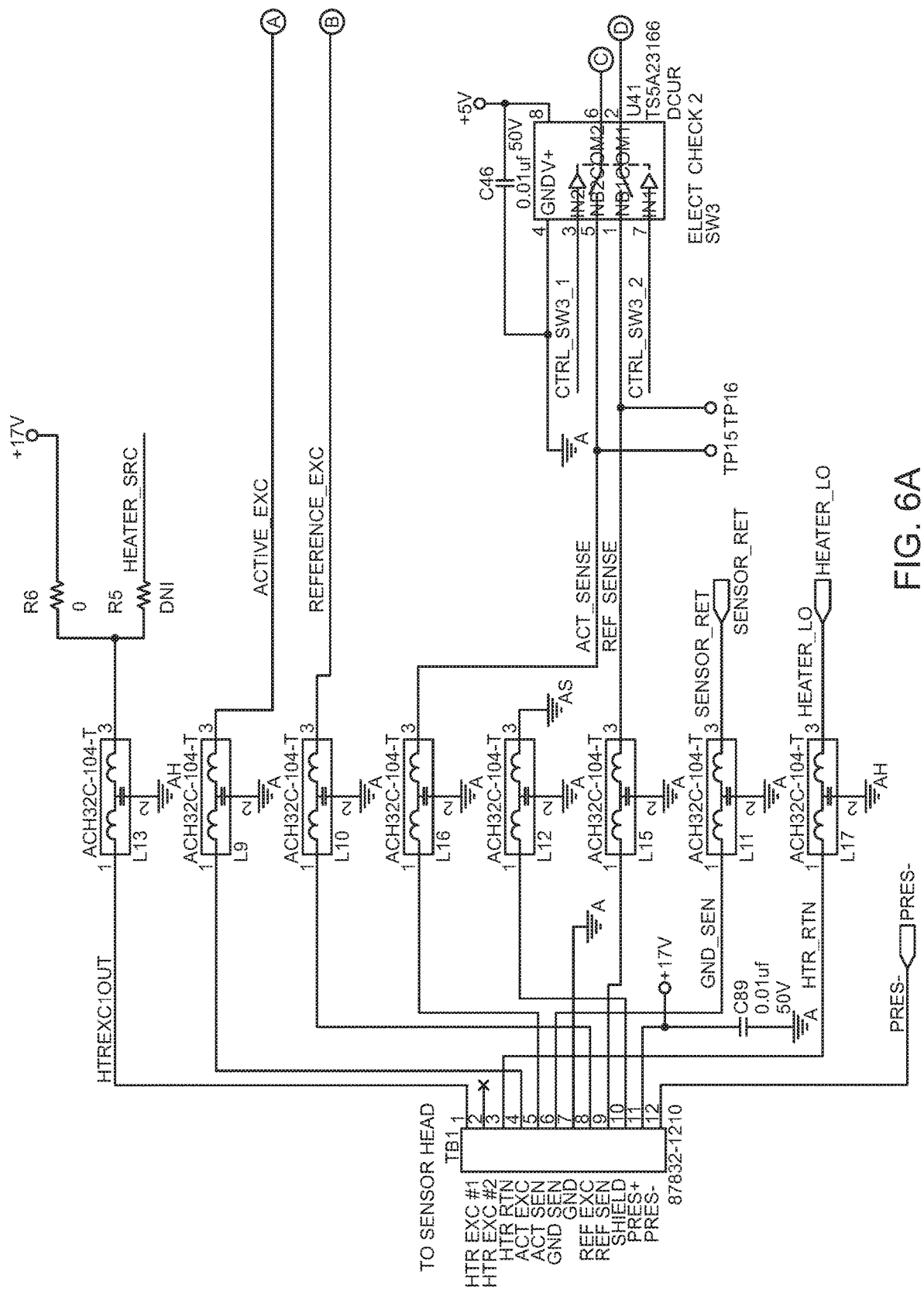

MASS FLOWMETER USING THERMAL DISPERSION TECHNOLOGY

TECHNICAL FIELD

This device relates generally to thermal dispersion type mass flowmeters and more particularly concerns an adaptive system to enable the flowmeter to employ both constant power and constant temperature differential technologies as may be appropriate for any fluid flow rate.

BACKGROUND ART

Thermal dispersion flowmeters are well known for measuring fluid flow and, particularly, mass flow of gas. While any type of fluid flow can be measured by this technology, the discussion herein will remain simplified by focusing on the mass flow of gas. While other sensor elements may be applicable, the discussion will treat the sensors as resistance temperature detectors (RTD) for convenience.

Thermal dispersion flowmeters measure the cooling effect of passing gas molecules. The sensor consists of a heated element, called the active element, and an unheated element, called the reference element. The temperature difference ($\Delta T$) between the active and reference elements is proportional to the mass flow of the gas.

It should be noted that fluids, gases in this case, may have a number of different characteristics. They may be dry or have some element of moisture; the pressures under which the gas flows may vary greatly; and the gas may have different densities, unrelated to pressure. Other variables may also exist. It is also true of liquids that their densities may be greater or less than water, so the characteristics must be taken into consideration when flow is being measured.

There are two mainstream sensing technologies that are generally used. With reference to FIGS. 2 and 3, they are:
1. Constant power, where the heated element receives constant power and the $\Delta T$ decreases when the mass flow increases. The constant power arrangement allows measurements of all flow rates, including very high flowrates, can deal with high loads of liquid content, and provides a very robust sensing signal without ripples or other disturbed sensing signals. A drawback of this mode of operation is that the response time can be slower than desired in the small percentage of cases where flow rates change very rapidly.
2. Constant temperature difference ($\Delta T$), where the heating element receives a variable power which is required to maintain a constant temperature difference $\Delta T$ between the active and reference temperature sensors. This variable power allows the sensors to read fast to changes in flowrate. A drawback of this mode of operation is that, as flow rates increase, maximum power to the heated sensor can be realized, beyond which readings are inaccurate.

Relevant characteristics of a constant power sensor are:
It can accept high loads of moisture;
it is tolerant to dirt;
it can measure very high flows;
it has extended rangeability (maximum flow:minimum flow), to 1000:1;
it has superior temperature compatibility;
it allows fail-safe operation as it can safe guard a healthy $\Delta T$ sensor signal; but
it is relatively slow responding, at 10 to 15 seconds.

Relevant characteristics of a constant $\Delta T$ sensor are:
It has a fast response time, about 1 second; but
it is less suitable for gas having moisture;
it is less suitable for high flows; and
it has limited rangeability (100:1, for example).

There are several reasons why thermal dispersion technology is especially suited to measure mass flow gas. Among them are:
It can directly measure mass flow;
it has no moving parts;
it causes no pressure drop;
it is low flow sensitive; and
it has high rangeability.

DISCLOSURE OF THE INVENTION

A purpose of this concept is to create a thermal dispersion drive technology that can work in either constant Delta T mode or constant power mode. As stated above, constant $\Delta T$ mode provides very fast time response but has stability and accuracy issues in some applications such as higher flow rates. Constant power mode works in all applications, but has a slower response time than constant $\Delta T$ mode.

The sensing system described uses adaptive sensing technology (AST) to combine the primary positive features of constant power and constant $\Delta T$ in a single instrument with the result that such an instrument has these characteristics:
It directly measures mass flow;
it has no moving parts;
it causes no pressure drop
it is low flow sensitive;
it has high rangeability;
it can accept high loads of moisture;
it is tolerant to dirt/dust/particulates;
it can measure flowrates from 0.25 to 1000 standard feet per second (SFPS) (0.08 to 300 m/sec)
it has a turndown ratio of 1000:1;
it has temperature capability from −70° C. to +450° C. (−94° F. to 850° F.);
it has a response time of about one second;
it is in compliance with ISO-14164 and many other international norms; and
it allows to monitor healthy sensor signals driving a fail-safe mode.

BRIEF DESCRIPTION OF DRAWINGS

The objects, advantages, and features of the concept, as disclosed, will be more clearly understood from the following description, when read in conjunction with the accompanying drawing in which;

FIGS. 6A-6D comprise a combined circuit diagram of details of the system;

BEST MODE FOR CARRYING OUT THE INVENTION

As employed herein, the following definitions apply:

Constant Delta (ΔT): This operational mode uses a feedback loop on the power to the heated sensor to maintain a constant temperature differential between active and reference RTD measuring devices regardless of changes in the surrounding fluid flow caused by different flow rates, temperatures, or pressure;

Constant Power: This operational mode maintains constant power to the heated sensor in all cases.

Figure 1:
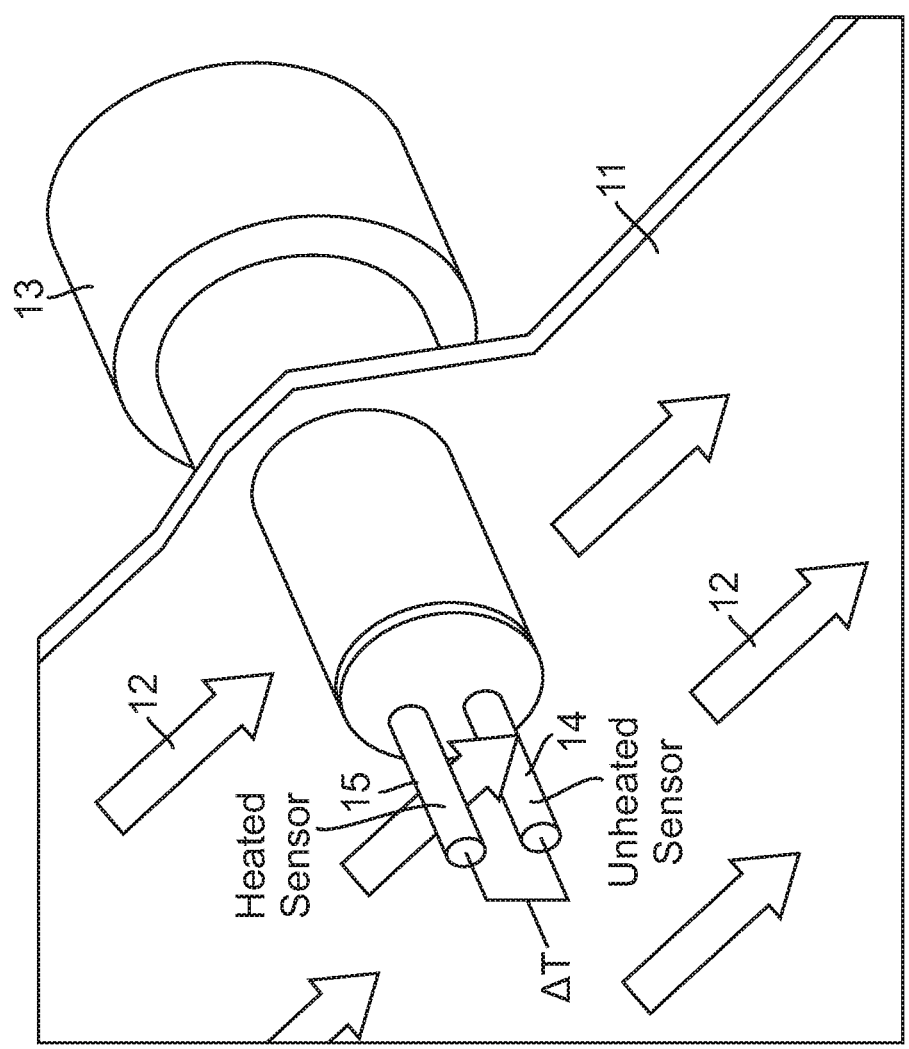
FIG. 1 is a schemic representation of a known thermal dispersion mass flowmeter in situ.

FIG. 1 shows a conventional thermal dispersion mass flowmeter in situ. The conduit wall is represented by reference numeral 11 and the fluid flow is represented by arrows 12. The flowmeter head 13 contains the usual electronics and provides the power and operational signals required for operation of thermal wells 14 and 15. Thermal well 14 contains the reference, or unheated, sensor, and thermal well 15 contains the active, or heated sensor.

Figure 2:
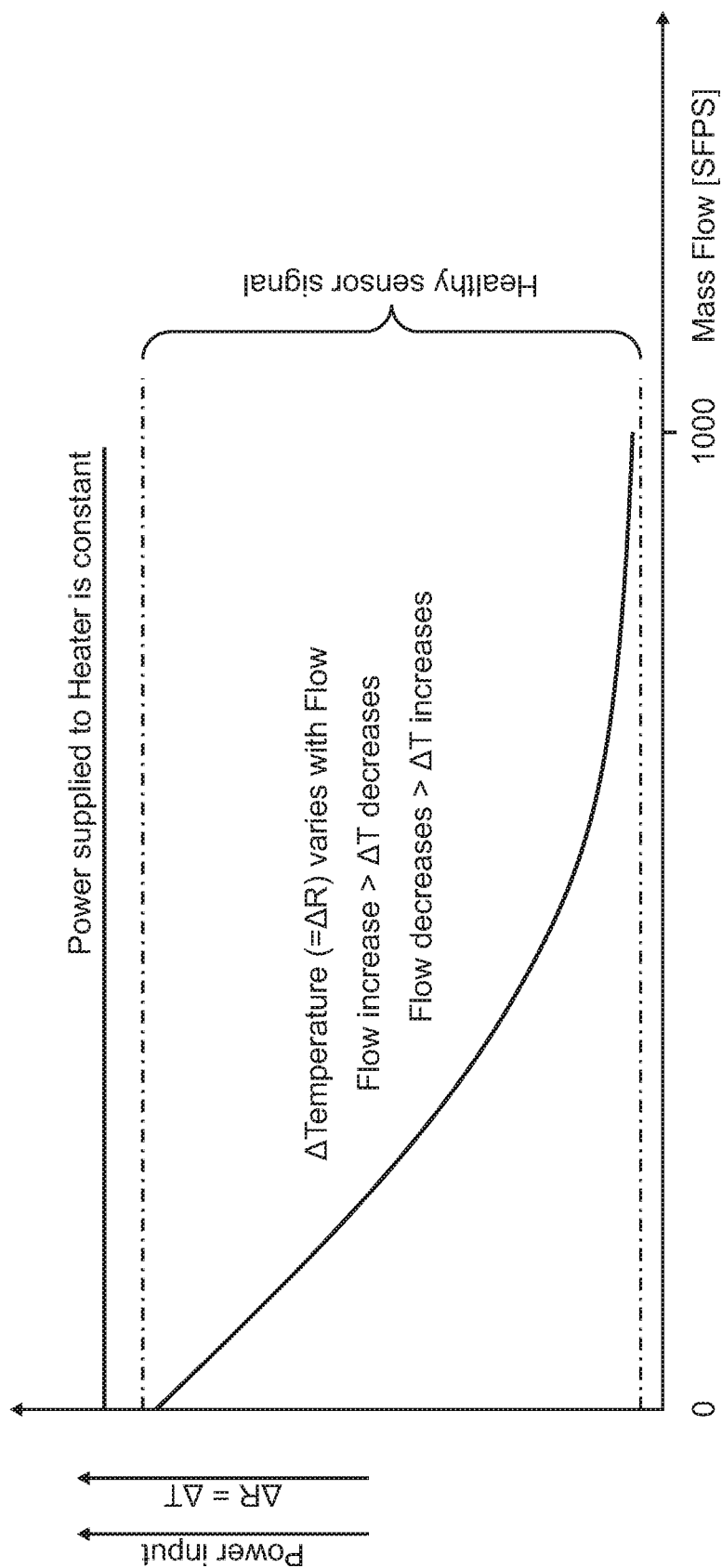
FIG. 2 shows graphically how a constant power mass flowmeter works.

FIG. 2 is self-explanatory, showing how a constant power flowmeter operates. As mass flow increases, ΔT decreases.

Figure 3:
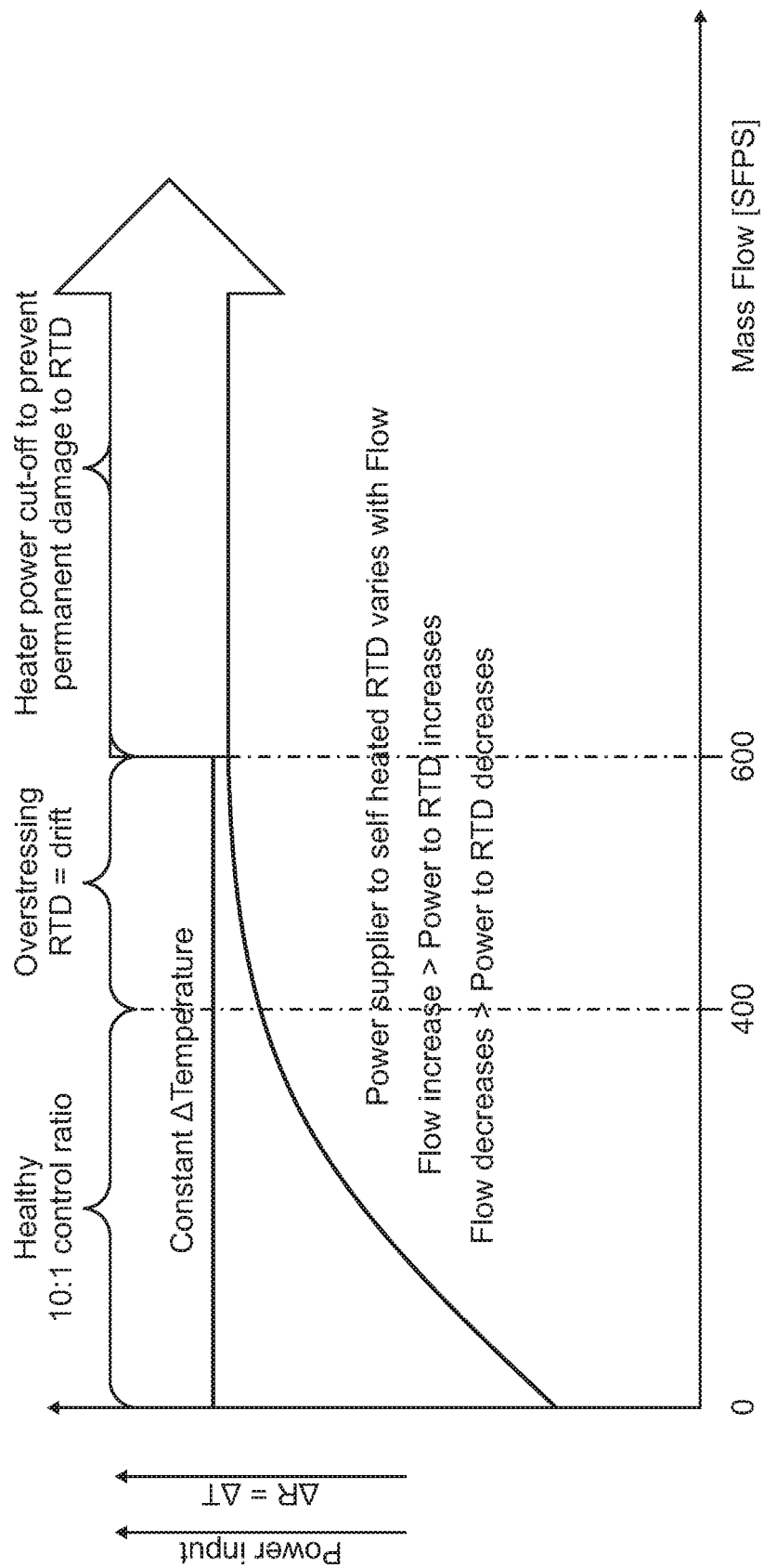
FIG. 3 shows graphically how a constant $\Delta T$ mass flowmeter works.

Similarly, FIG. 3 graphically shows how a constant ΔT flowmeter works. Note that power to the active sensor heating element increases as flow rate increases. As shown here, at about 400 SFPS, the power is approaching maximum, that is, a stress level, where flow rate readings tend to become inaccurate. While this system may provide somewhat useful results up to as high as 600 SFPS, accuracy may be compromised at these high mass flow levels. These flow rates are exemplary only and for different installations, the power to the heating element in order to maintain a constant ΔT may be lower or higher than that shown.

Figure 4:
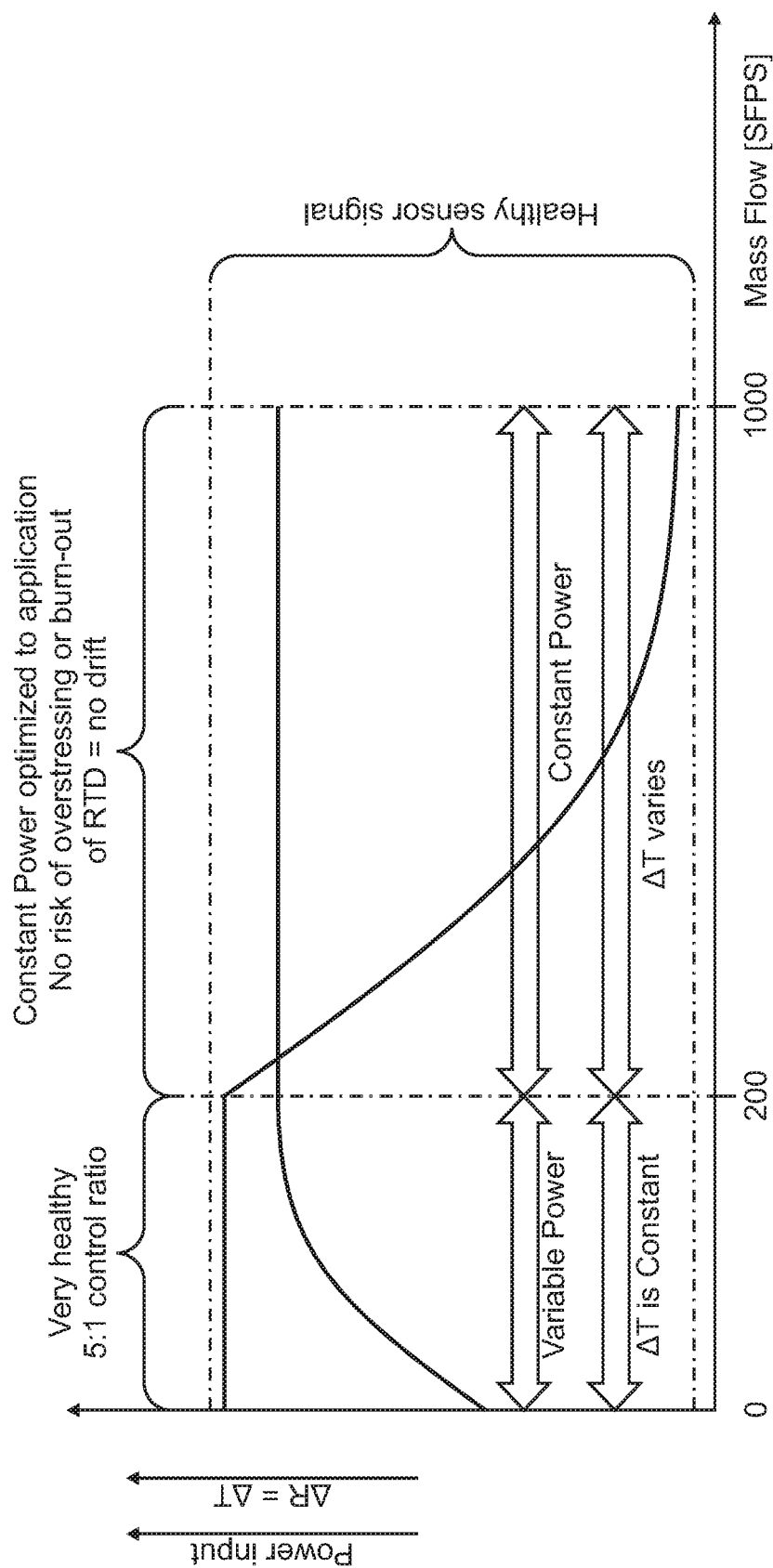
FIG. 4 shows graphically how the instrument according to the present concept works.

With reference now to FIG. 4 it can be seen that at lower flow levels the instrument according to an embodiment of the invention, maintains constant voltage differential (ΔT) between two sensors where one sensor is heated by a separate heater and one sensor is non-heated. This voltage differential is maintained even if the flow rate past the instrument sensors is increased or decreased. Power to the separate heater in the heated or active sensor is increased or decreased as needed via a feedback loop in order to maintain the constant voltage differential.

One limitation of the constant ΔT approach is that there is a predetermined maximum heater power limit and at higher flow rates, above 200 SFPS as shown as an example here, when this maximum power limit is reached, the constant voltage differential will no longer be maintained and will actually decrease with higher flow rates. This, of course, would result in inaccurate mass flow rate readings in instruments that employ only a constant ΔT operational function.

Unlike prior art constant ΔT only units, the instrument herein described will continue to function once the maximum heater power is reached at higher flow rates. This instrument is always measuring both the heater power to the active sensor and the voltage differential across the two sensors. When the heater current to the active sensor reaches its maximum, and the applied heater current remains constant, higher flow rates can still be accurately calculated by the internal software algorithm by using the measured voltage differential across the sensors.

This aspect of the system allows for very fast time response while in constant voltage differential mode, yet also allows for continued functionality at very high flow rates, up to 1600 standard feet per second (SFPS). FIG. 4 shows the mass flow to 1000 SFPS, as an example. Typical constant ΔT only units are "maxed out" when they are no longer able to maintain the constant voltage differential across the sensors because the predetermined maximum power has been reached but mass flow rate continues to increase. Some instruments are limited to flow rates as low as 300 SFPS. The flow rate depends upon the characteristics of the flowing media, as well as on the instrument, so FIG. 4 shows 200 SFPS for exemplary purposes.

The crossover where constant ΔT switches to constant power (at 200 SFPS in this particular example) is a function of the maximum power available, which is a predetermined value, and the heat transfer rate of the media. A higher maximum power will shift the crossover point to the right, or higher SFPS, as shown in FIG. 4. A lower maximum power will shift the crossover to the left.

Similarly, a lower heat transfer media will shift the crossover to the right, while higher heat transfer media will shift the crossover to the left.

For example, natural gas transfers heat better than air, so the crossover point would move to the left with natural gas as the media, as compared with air. Hydrogen transfers heat even more, so when the media is hydrogen, the crossover point will move farther to the left.

The present technology can also be configured so that constant power to the separate heater is maintained and the voltage differential across the sensors is allowed to drop as flow rates increase. There are some applications, particularly semi-wet and low flow rate applications, where this configuration performs better. When operating in this manner the instrument can be used to either optimize time response or optimize stability, depending on the application.

Another feature of this technology is that it can be re-configured in the field to the constant power configuration without affecting the accuracy of the unit. This is useful because some customers do not know the specific requirements of their particular application until the unit is installed. Being able to change the configuration of the instrument in the field without requiring a factory recalibration is a major convenience to the end user.

The basic mathematical principles of operation of mass flow rate technology are rather straightforward. At a given mass flaw rate with a specific media composition and constant temperature, there is a relationship between mass flow rate and heat transfer that is characterized by the following simplified equation:

$$\text{Mass flow} = \frac{K * P}{dT} \qquad \text{Eq. 1}$$

Where P=heating power to the active (heated) sensor;
dT=temperature differential between the heated sensor and the non-heated sensor; and
K is a constant determined by calibration and is only valid for that particular mass flow rate, temperature, and specific media composition. For calibration purposes, the pressure in the conduit is subsumed in the mass flow rate factor. A functioning flow meter requires an array of K values to be determined over the desired mass flow range in the desired media. The K values must be curve fitted to a linearizing algorithm, examples of which are available in the marketplace.

Unlike other flowmeters, this technology constantly measures both heating power (P) and temperature differential ($\Delta T$) simultaneously and uses them in the linearizing algorithm. This allows the meter to be optimized for faster time response by varying the power to keep the $\Delta T$ constant or optimizing stability and accuracy by keeping the power constant and allowing the $\Delta T$ to vary.

Figure 5A:
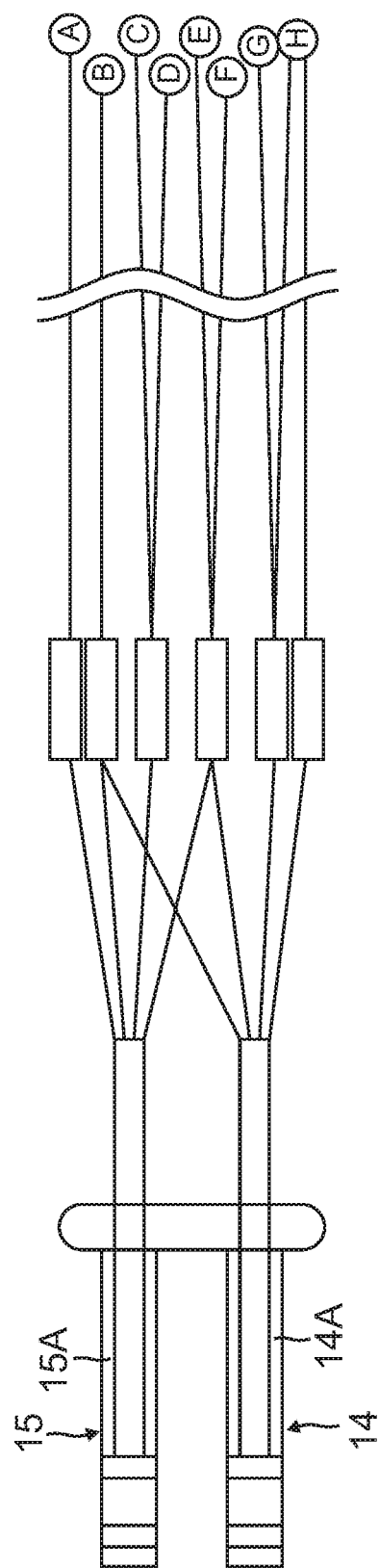
FIGS. 5A, 5B, and 5C comprise a combined schematic and block diagram of the instrument of the present concept.
Figure 5B:
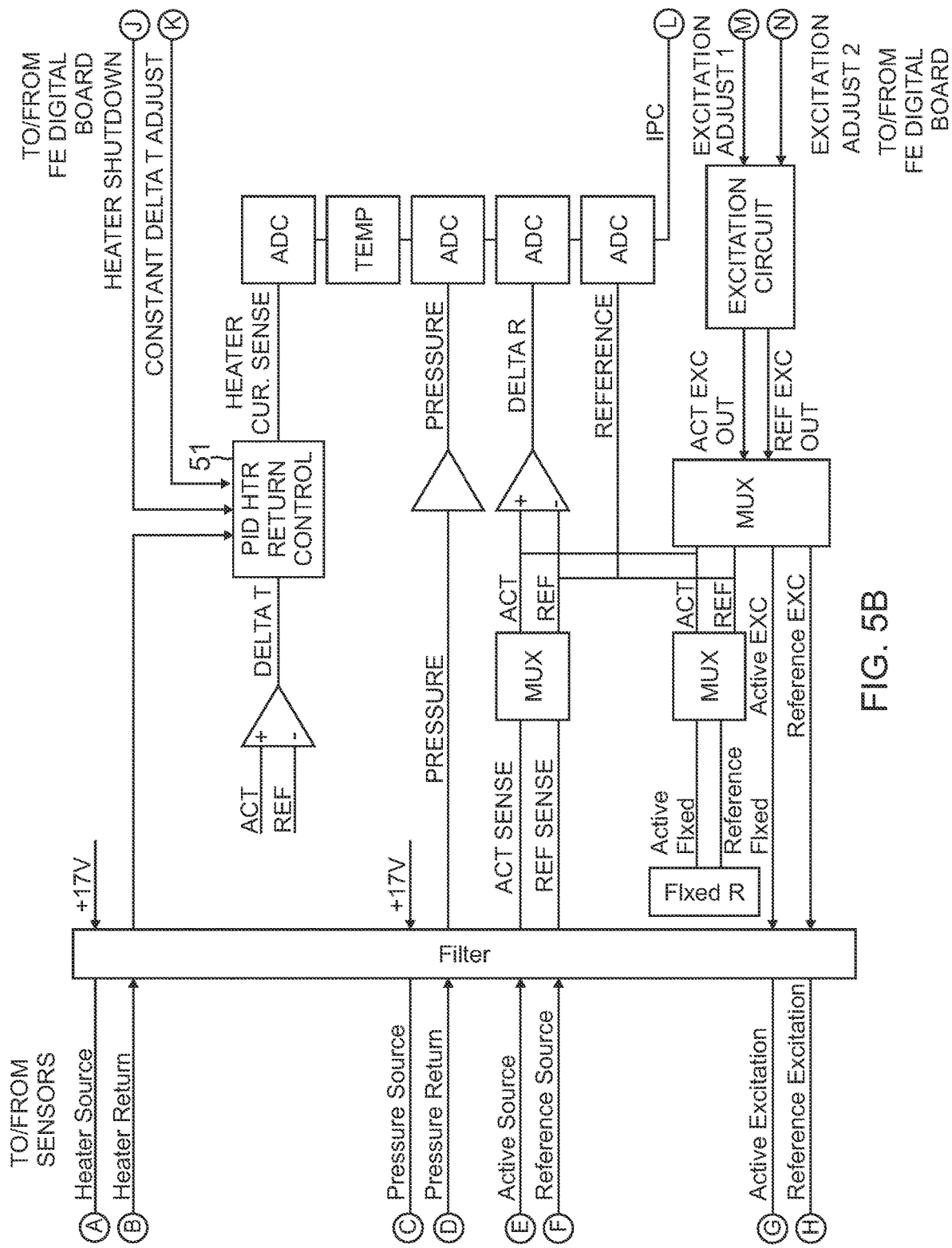

With reference to FIG. 5B, PID Heater Return Control block 51 enables the heater power to the active or heated sensor to be controlled to a constant $\Delta T$ between the active and the reference sensor (for example, RTD) when operating at the lower end of the flow range, that is, on the left side of FIG. 4. The heater power is set to a constant current when operating at the higher end of the flow range.

Although a separate heater for the active sensor element is a preferred embodiment, the system can operate by self-heating the active sensor by employing a higher current across the active RTD.

With further reference to FIG. 5, this system is comprehensively depicted. Active sensor 15 and reference sensor 14 are identified and it is preferred that they be structurally identical. Thus, any two thermal wells 14, 15 (FIG. 5A) can be built into the present system. The heater may have a coil, or any other form. Coils 14A and 15A, for example, designate the heater element in this figure. One is energized to make its sensor the active one, and the other is the reference sensor.

As stated previously, the system of FIGS. 5-10 continuously monitors both the power level delivered to the active sensor heater and the temperature difference, $\Delta T$, between the active and the reference sensors.

FIG. 4 is a graphic representation of the operating status of the system from very low, $\geq 0$ SFPS, to high, $\geq 1000$ SFPS, mass flow. At the low end of the instrument's range, shown as 0 to 200 SFPS for exemplary purposes only, the system operates in the constant $\Delta T$ mode. As the power level approaches the stress level, shown at 400-600 SFPS in the FIG. 3 example, the instrument shifts to operate in a constant power mode.

As stated above, the conventional constant $\Delta T$ mode of operation provides fast response, in the range of about one second. When an instrument operates in the constant power mode at the lower mass flow rates, the response time can be as long as 10-15 seconds. However, this instrument provides fast response time at the lower flow rates, because it is operating in the constant $\Delta T$ mode, and it also provides relatively fast response time, $\leq 1$ to 5 seconds, at the higher flow rates when operating in the constant power mode. This fast response time is due to the fact that the flowing media carries heat away from the active sensor much more rapidly at higher mass flow rates.

As stated previously, there can be no hard definition of where, on the flow rate scale, low flow rates change to high flow rates because that depends upon the factors which must be taken into consideration when the K constant is established when an instrument is calibrated at the factory. When an instrument is calibrated, the manufacturer must take into account the media characteristics expected to be encountered by the end user, which information is provided to the manufacturer.

Figure 5C:
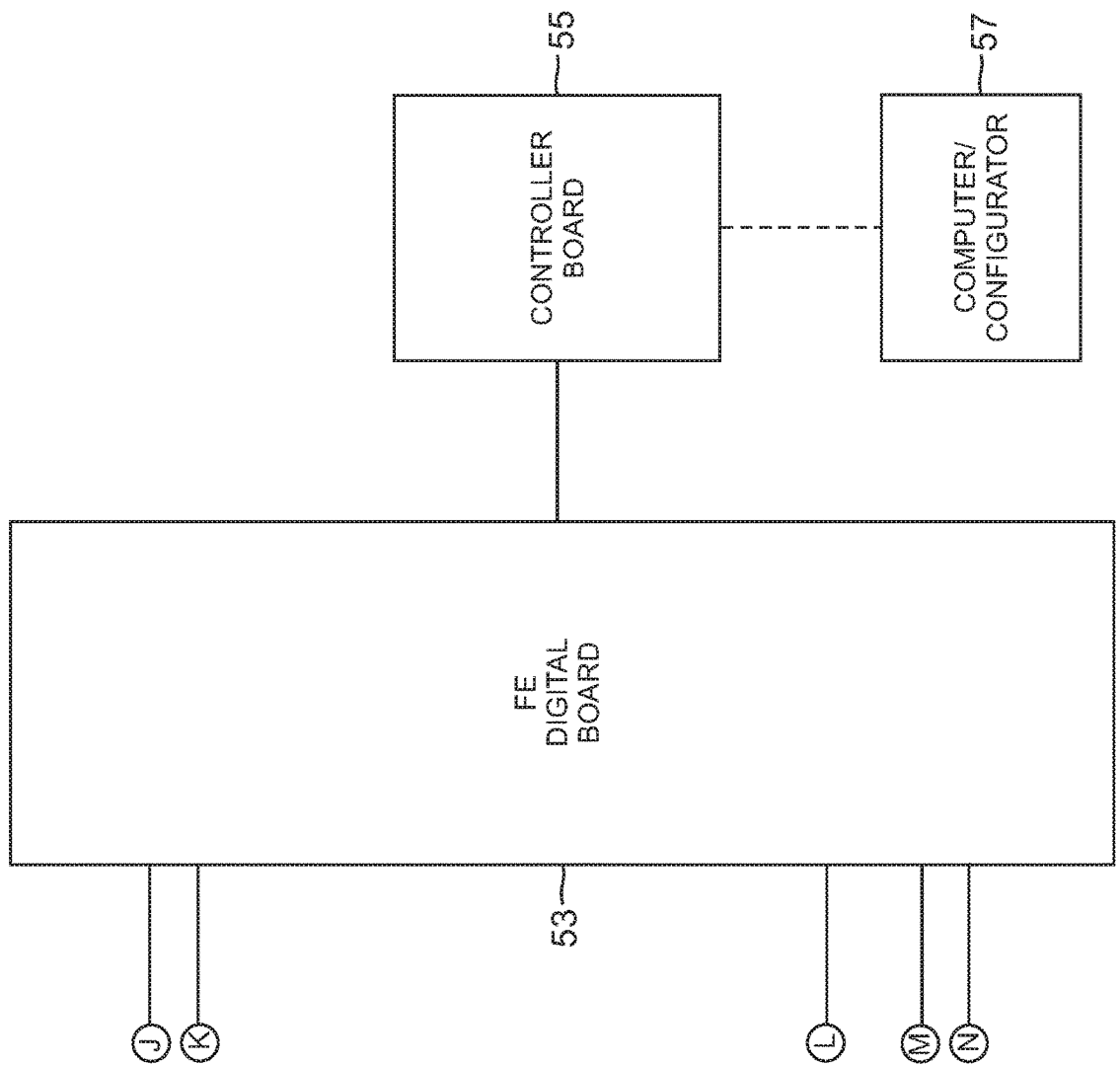

FIG. 5C is a continuation of the block diagram of FIGS. 5A and 5B. The output of the portion of the system shown in FIG. 5B goes to FE Digital Board 53. The term "FE" indicates that signals are received from the flow element, shown in FIG. 5A. The $\Delta T$ and the power inputs that are constantly monitored are handled in board 53. The determination to shift to constant power mode as the mass flow rate approaches the stress level, or crossover point, as shown in FIG. 4, or to shift to constant $\Delta T$ mode as the flow rate decreases, is made by controller board 55. This functionality is micro-processor controlled in board 55. One purpose of board 53 is to convert the analog signals from the sensors to digital signals to be used by controller board 55.

As already stated, the end user can adjust the set point as the media characteristics change or vary. This is done by means of computer/configurator 57 which is selectively plugged into a USB port in board 55 by the operator.

It should be noted that boards 53 and 55, as well as the circuitry of FIGS. 6-10, may be contained in a head, of the type shown in FIG. 1 as head 13. Alternatively, some or all of the circuitry could be at a location remote from the actual instrument which includes thermal wells 14 and 15 mounted through the wall of the conduit through which the media flows. The coupling or connections between the sensors and the circuitry of FIGS. 6-10, as well as the blocks shown in FIG. 5C, could be hard wired connected, or wirelessly coupled.

FIGS. 6-10 show circuitry for operating the system of FIGS. 4 and 5 from an internal standpoint. While the circuitry is self-explanatory when reviewed in conjunction with FIG. 5, details of FIGS. 6-10 are set out here to expand upon one's understanding of that relatively complex circuitry. This description may be more detailed than is necessary, but the purpose is to aid in understanding without leaving gaps.

With reference to FIG. 6A, L9-L13 and L15-L17 (ACH32C-104-T) are T-type electromagnetic interference filters used to filter out electrical noises. And U41 (TS5A23166) a 2-channel single-pole-single-throw analog switch used to select or deselect the ACT_SENSE and REF_SENSE signals, controlled by CTRL_SW3_1 and CTRL_SW3_2 signals respectively.

Figure 6B:
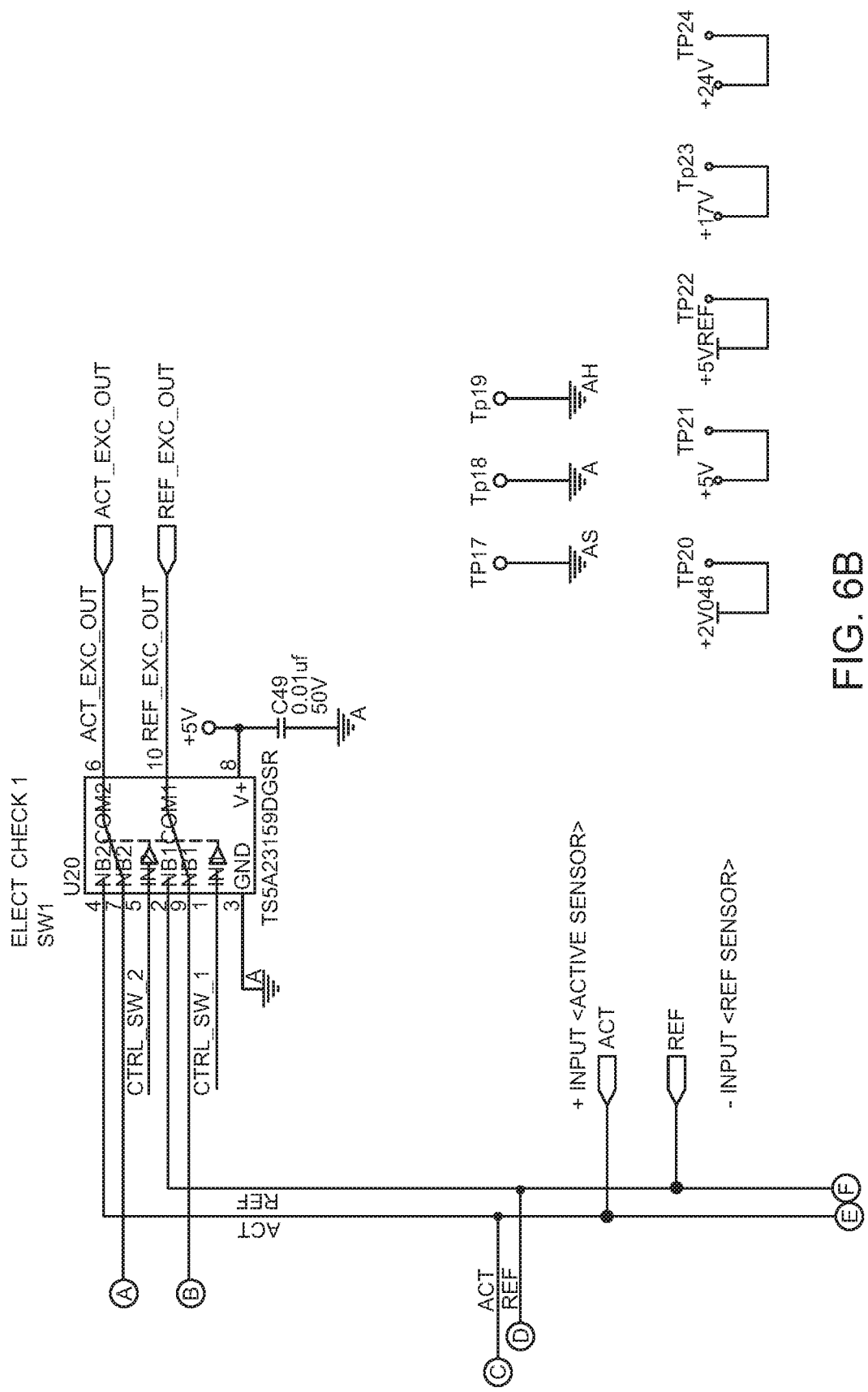

FIG. 6B continues from FIG. 6A, where U20 (TS5A23159DGSR) is a 2-channel single-pole-double-throw analog switch used to connect Point A or Point C to ACT_EXC_OUT and Point B or Point D to REF_EXC_OUT, controlled by CTRL_SW_2 and CTRL_SW_1 signals respectively.

Figure 6C:
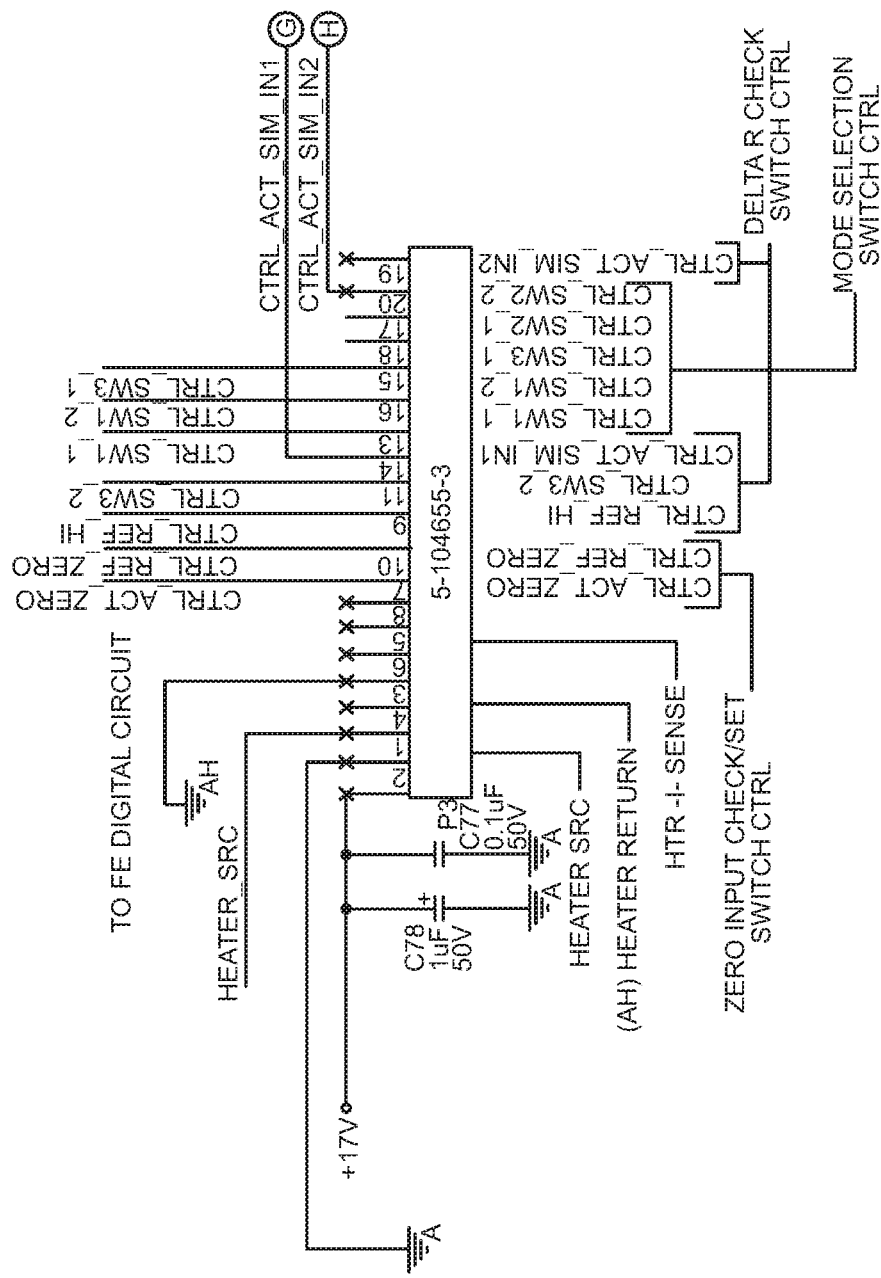
Figure 10A:
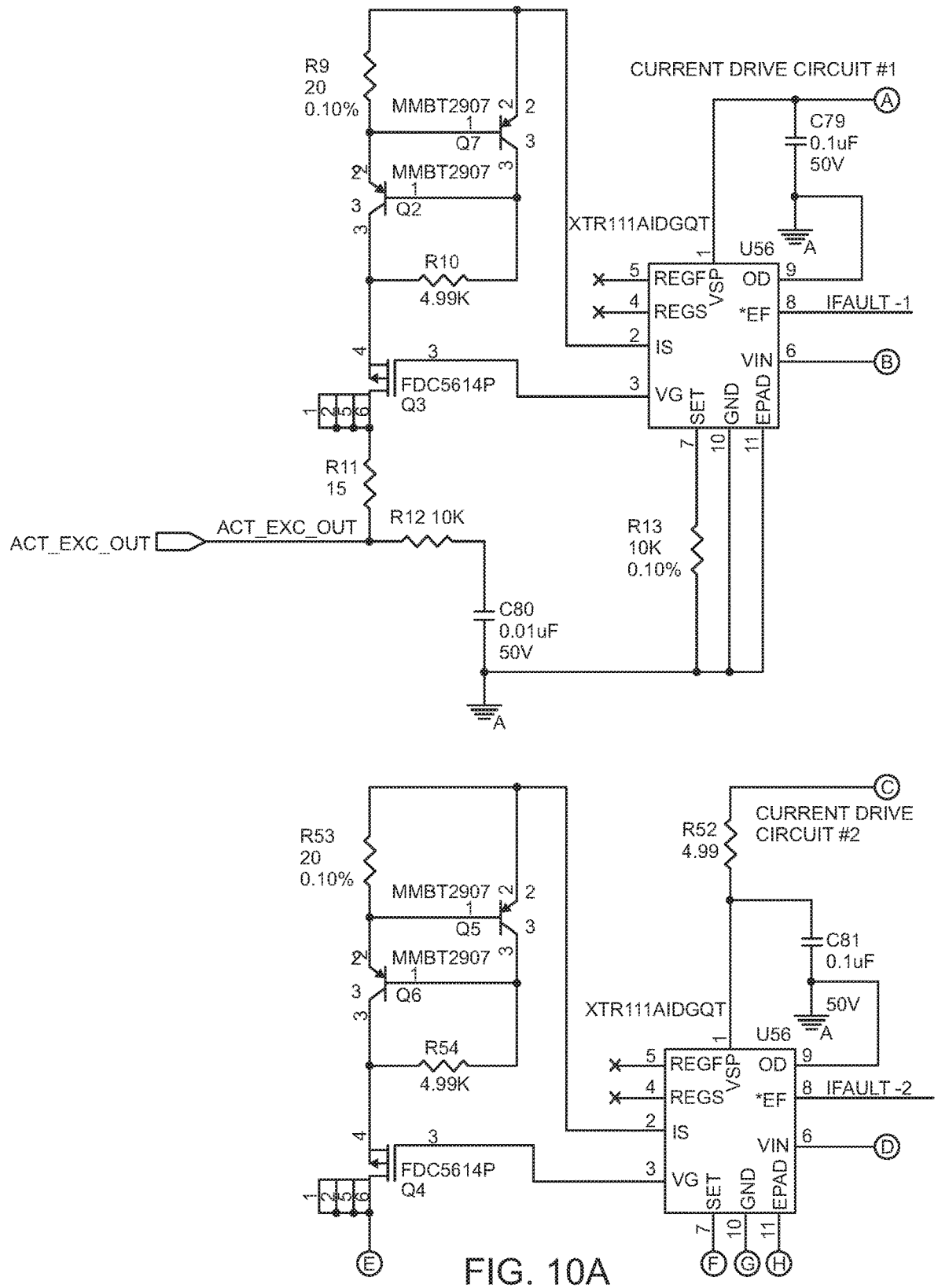
FIGS. 10A-10C comprise a combined circuit diagram of further details of the system.
Figure 10B:
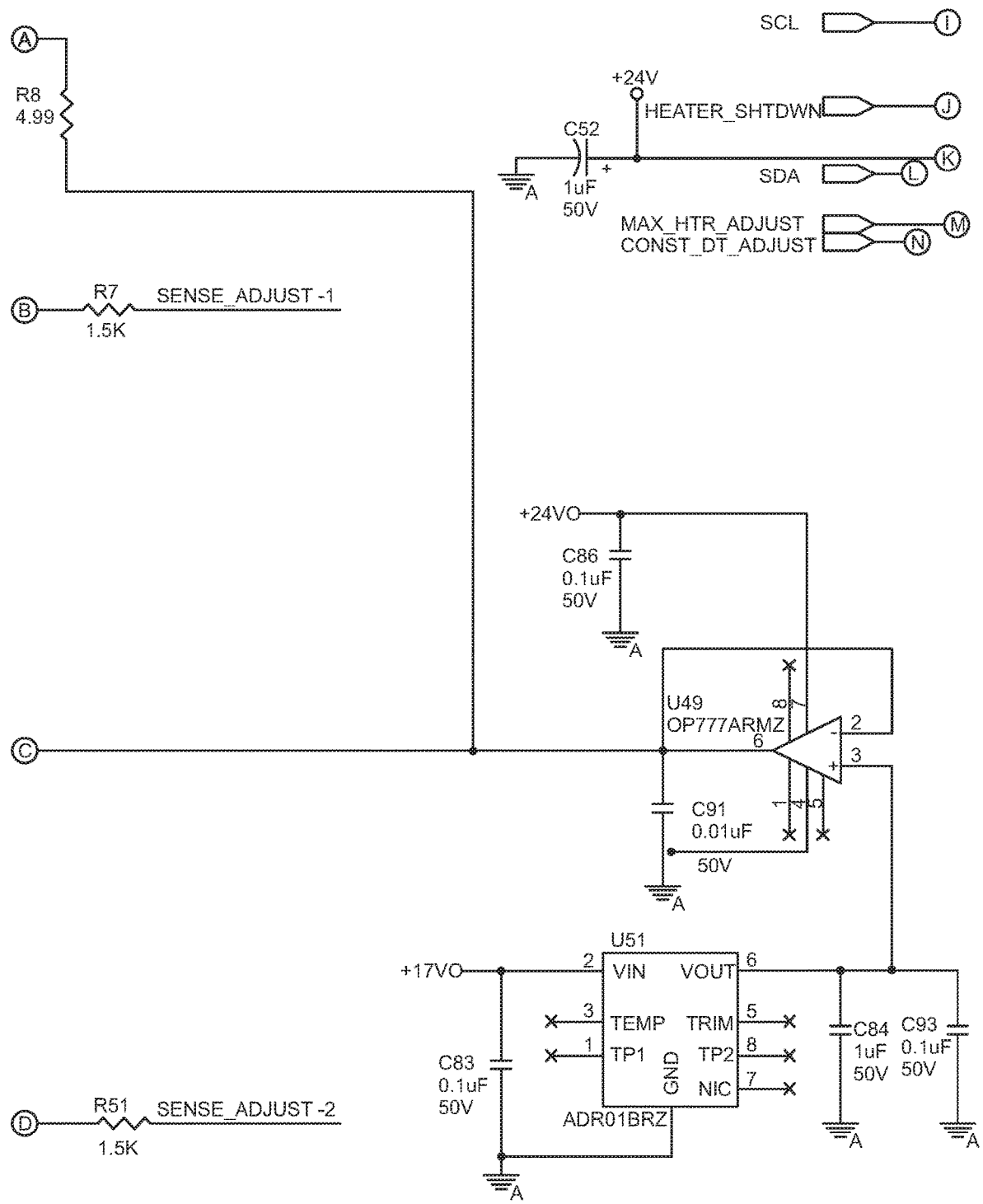
Figure 10C:
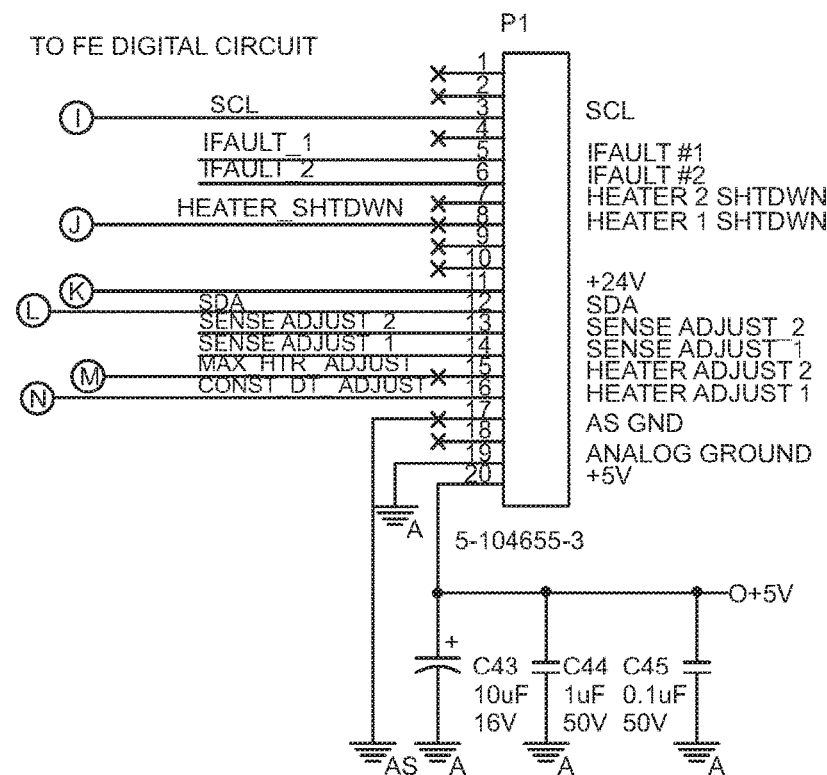
Figure 10C:
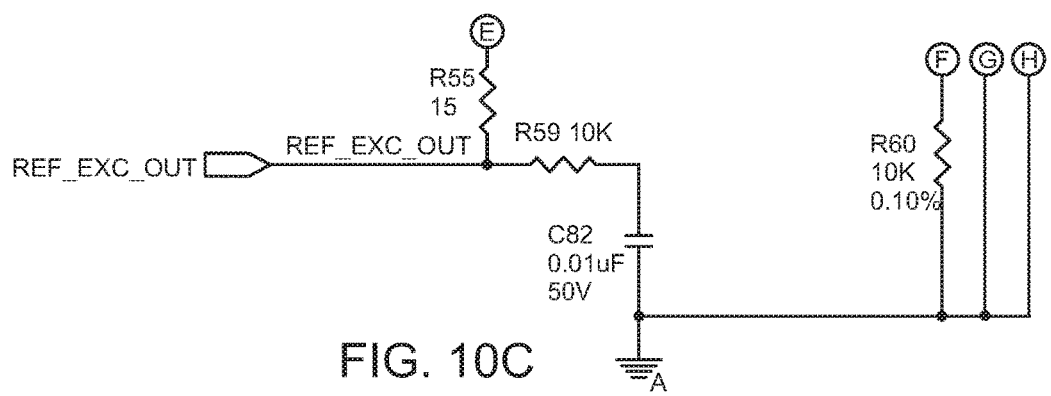
Figure 11:
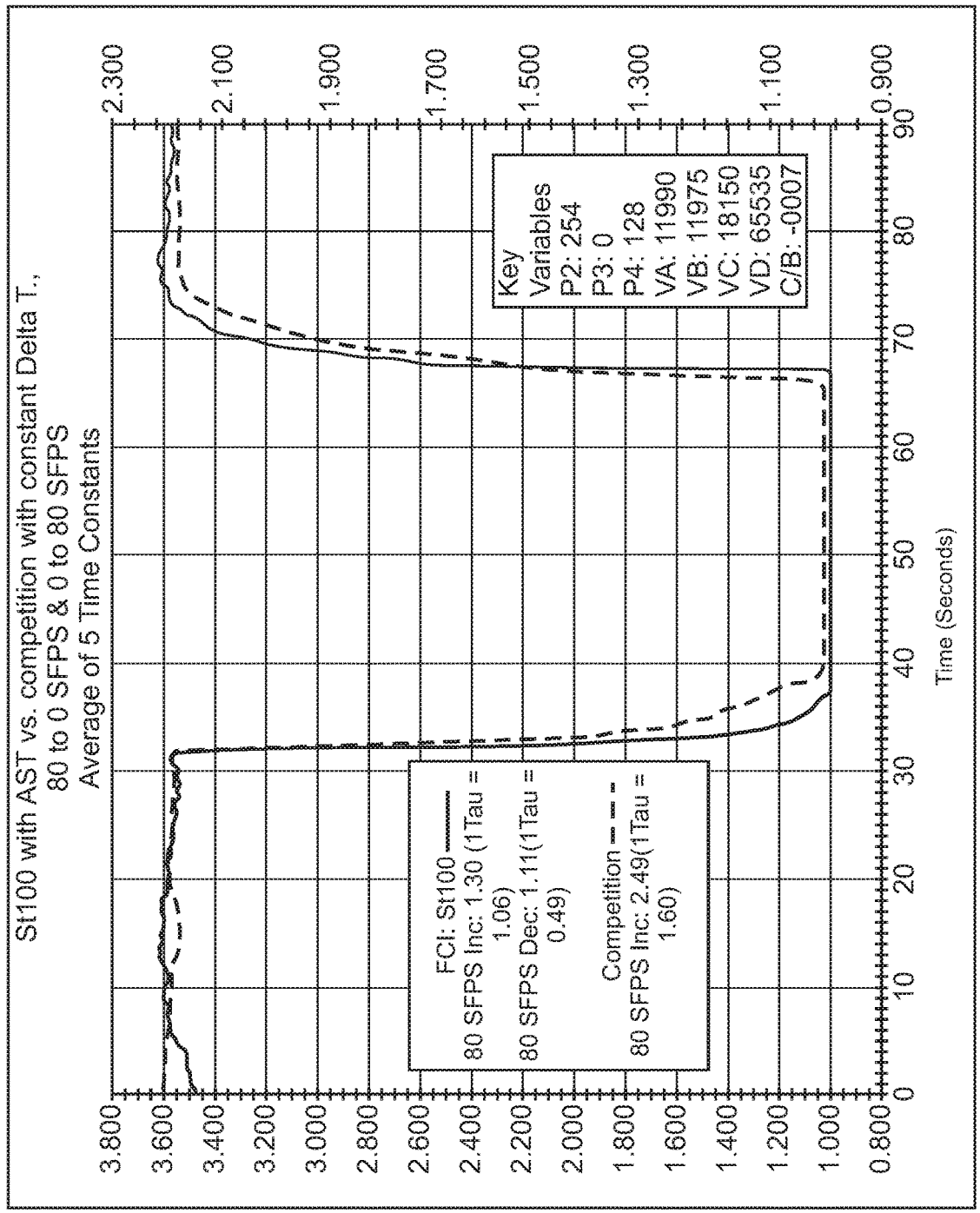
FIG. 11 is an exemplary graph showing comparison between the present system and known competitors.

With reference to FIG. 6C and to FIG. 10C, P3 and P1, respectively, are connectors that connect the FE Adaptive Sensing Technology (AST) Analog Board to FE Digital Board 53, shown on FIG. 5C.

Figure 6D:
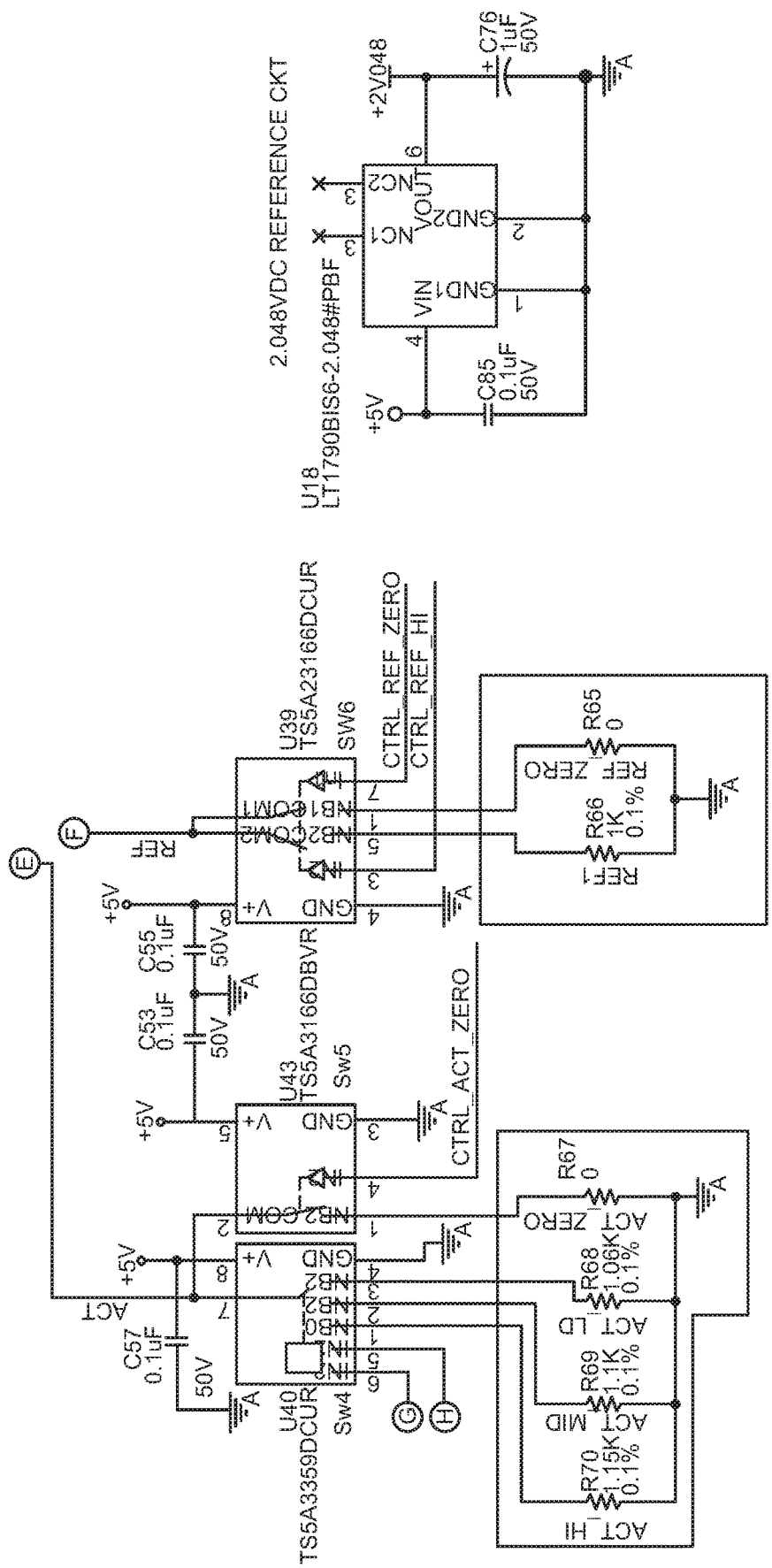

In FIG. 6D, U40 (TS5A3359DCUR) is a single-pole-triple-throw analog switch used to connect R70, R69, or R68 to Point E, controlled by Point G and Point H. U43 (TS5A3166DBVR) is a single-pole-single-throw analog switch used to connect R67 to Point E, controlled by CTRL_ACT_ZERO signal. U39 (TS5A23166DCUR) is a dual single-pole-single-throw switch used to connect R66 (controlled by CTRL_REF_HI) or R65 (controlled by CTRL_REF_ZERO) to REF Point F. U18 (LT1790BIS6-2.048 #PBF) is a Low Dropout Voltage Reference chip that takes +5V input and produces 2.048 Volts output.

Figure 7A:
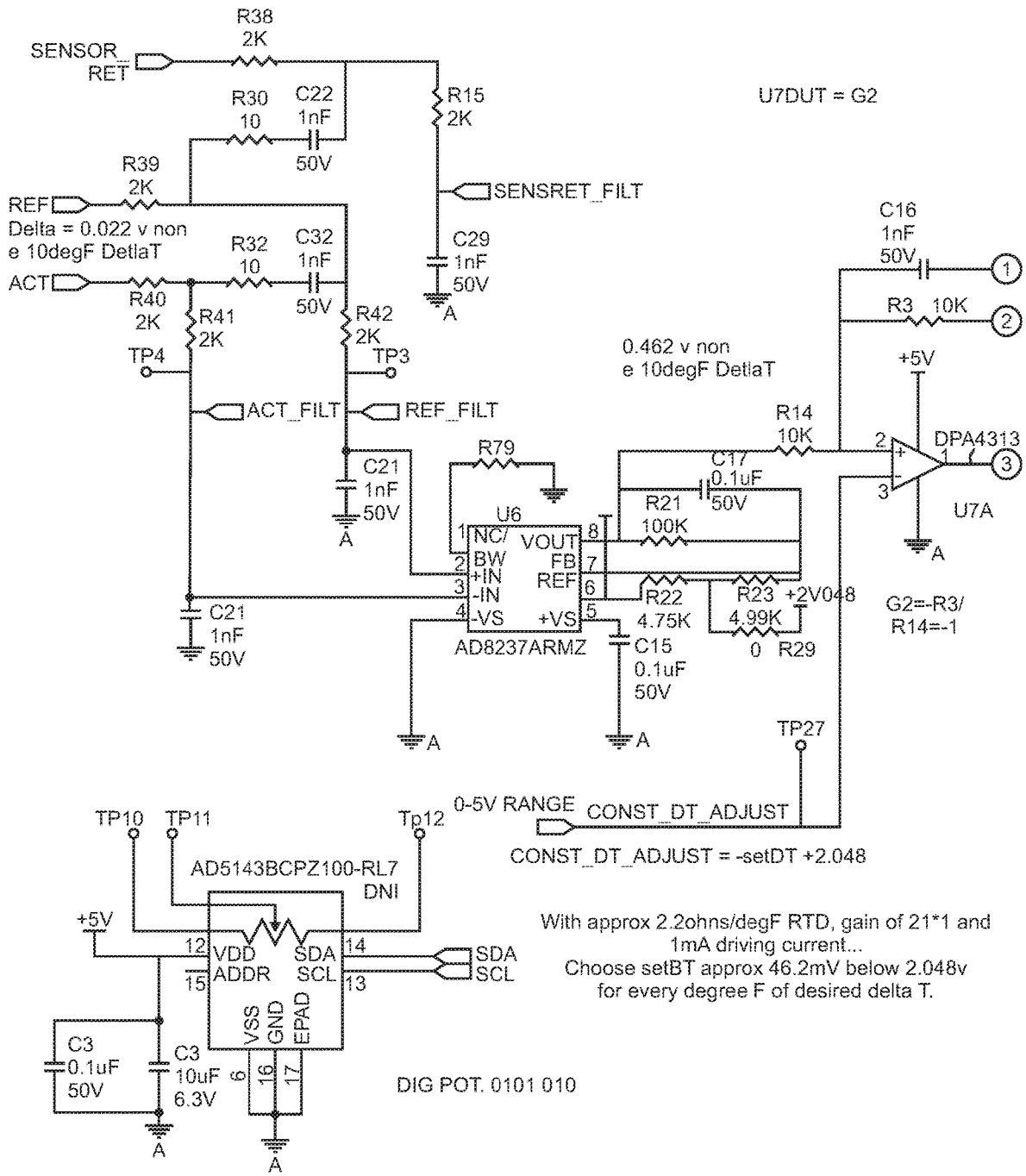
FIGS. 7A and 7B comprise a combined circuit diagram of further details of the system.

With reference to FIG. 7A, part AD5143BCPZ100-RL7 is a nonvolatile digital potentiometer used to adjust the gains of the PID (Proportional, Integral, and Derivative) circuits. Referenced to SENSOR_RET, R38, R30, and C22 form a low pass filter circuit, and referenced to A Ground, R39, R42, and C21 form another low pass filter for the signal from the Reference RTD, REF; this filtered signal is labeled REF_FILT and is connected to the +IN terminal of U6. Similarly, referenced to REF, R40, R32, and C32 form a low pass filter circuit, and referenced to A Ground R40, R41, and C21 form another low pass filter for the signal from the Active RTD; this filtered signal is labeled ACT_FILT and is connected to the –IN terminal of U6. U6 (AD8237ARMZ) is an Instrumentation Amplifier used to amplify the difference signal between +IN and –IN terminals, with the gain of 1+R21/R22. And U7A (OPA4313) is an Operational Amplifier used to compare the output of U6 and the CONST_D-T_ADJUST (Delta-Temperature Set-Point) signal, with the gain of –R3/R14 and a low pass filter formed by R3 and C16.

Figure 7B:
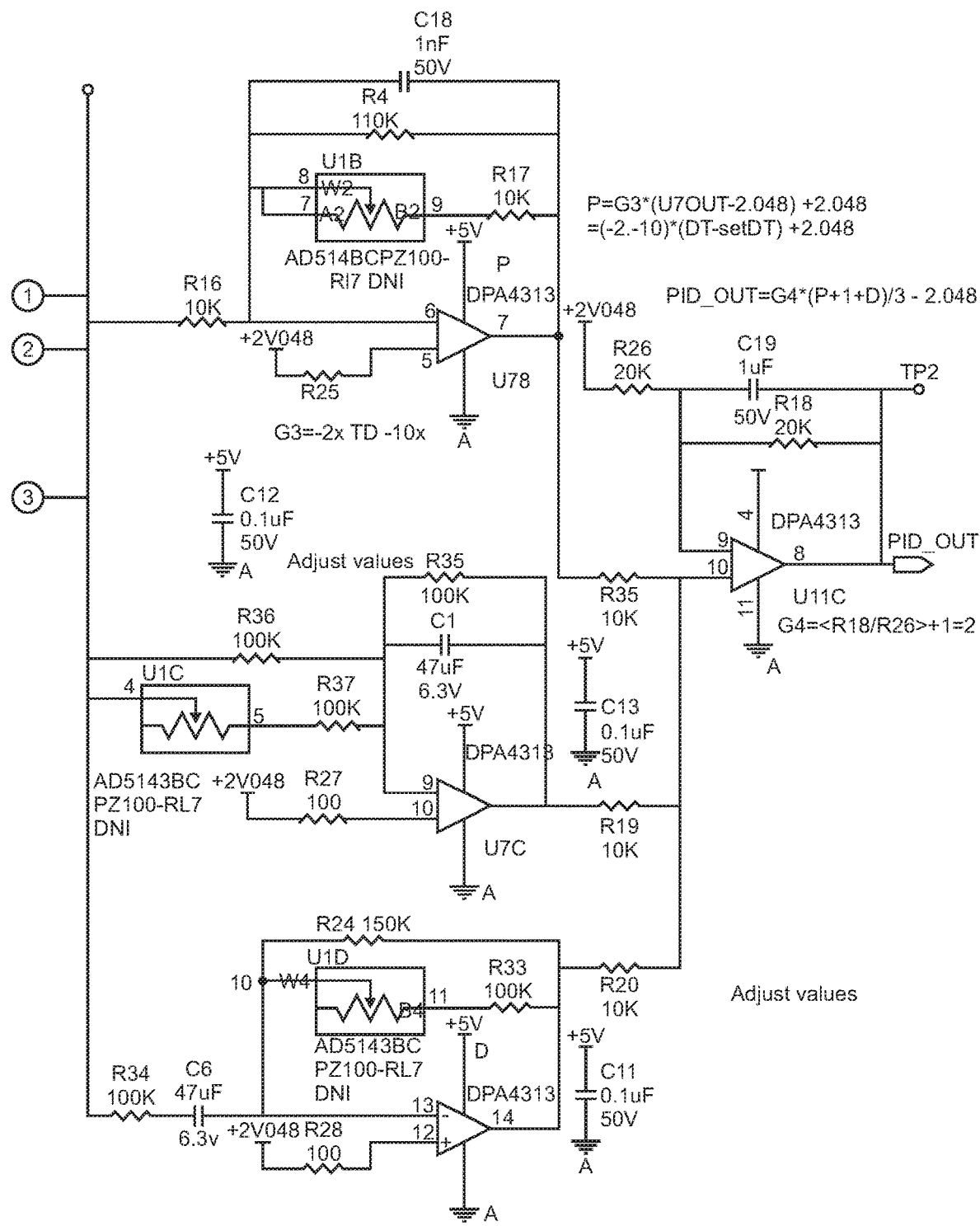

In FIG. 7B, R16, R4, C18, R17, U1B, and the upper DPA4313 Op-Amp form the Proportional (P) of the PID circuits. R36, R35 (100 k), R37, C1, U1C, and the middle DPA4313 Op-Amp form Integral (I) of the PID circuits. R34, C6, R24, R33, U1D, and the bottom DPA4313 Op-Amp form the Derivative (D) of the PID circuits. And R35(10 k), R19, R20, and the right DPA4313 Op-Amp form a summing circuit that sums the P, I, and D signals and produces the PID_OUT signal which is used to control the heater current (see FIG. 5B).

Figure 8A:
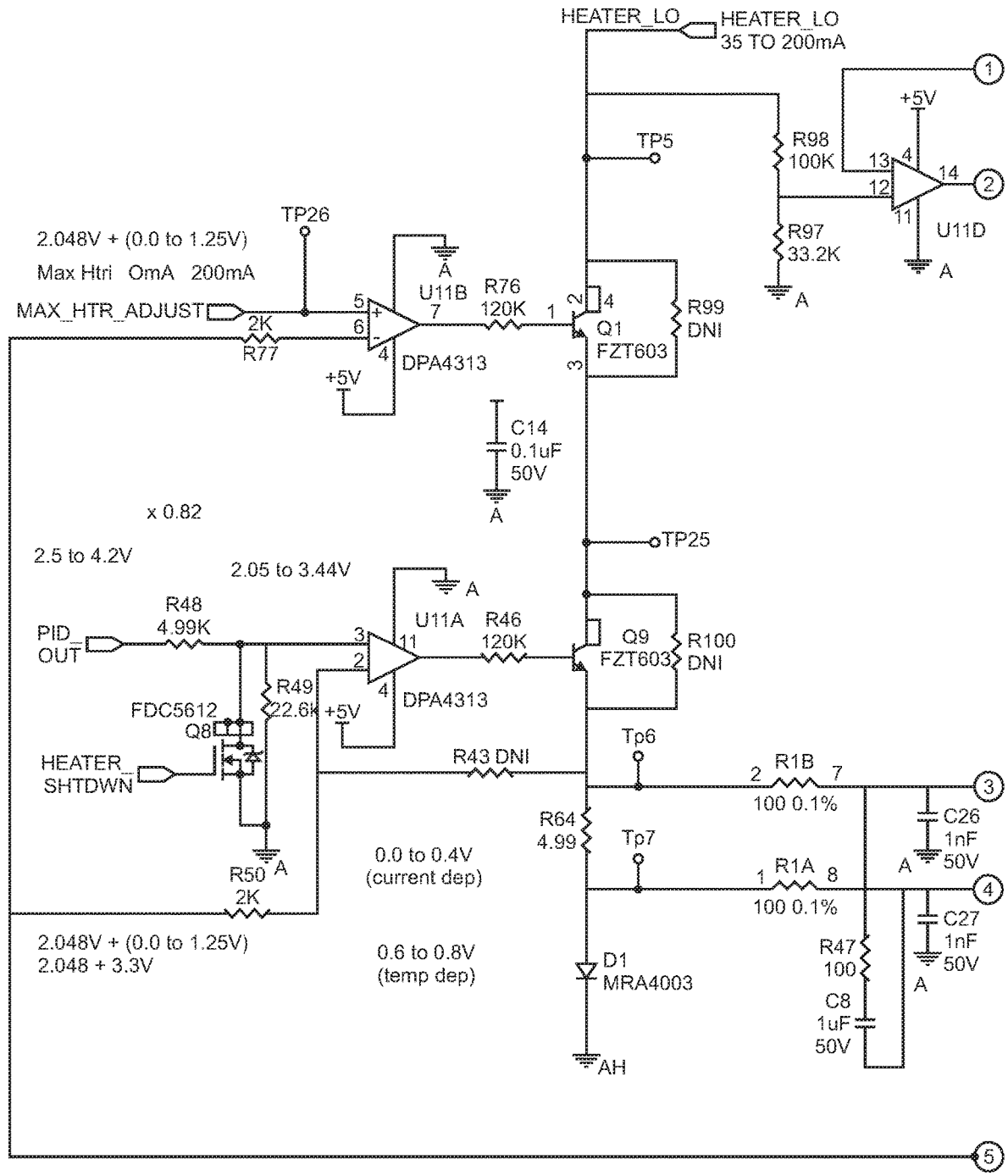
FIGS. 8A and 8B comprise a combined circuit diagram of further details of the system.

With reference to FIG. 8A, U11B (DPA4313), R76, and Q1 form a heater current control circuit; when the difference voltage between pin 5 and pin 6 of U11B is positive, Q1 is turned on, allowing healer current to flow from HEATER_LO to AH Ground if Q9 is also on. Similarly, U11A, R46, and Q9 form another heater current control circuit; when the difference voltage between pin 3 and pin 2 of U11A is positive, Q9 is turned on, allowing heater current to flow from HEATER_LO to AH Ground if Q1 is also on. The MAX_HTR_ADJUST is the DC (direct current) signal from an output of a digital-to-analog converter (DAC) (from the FE Digital Board shown in FIG. 5C) used to set the maximum heater current allowed in the system. When the voltage at Point 5 is greater than either the MAX_HTR_ADJUST or PID_OUT or both, the heater current is reduced until the difference temperature between the Active RTD and the Reference RTD equals to the desired delta temperature (Delta-T) set by the CONST_DT_ADJUST signal in FIG. 7A. R64 is used to sense heater current. R1B, C26, R1A, C27, R47, and C8 form filter circuits for the signal sensed at R64, R98, R97, and U11D form a heater open/shorted detection circuit. And Q8 (FDC5612) is used to shut down the heater, controlled by the HEATER_SHTDWN signal.

Figure 8B:
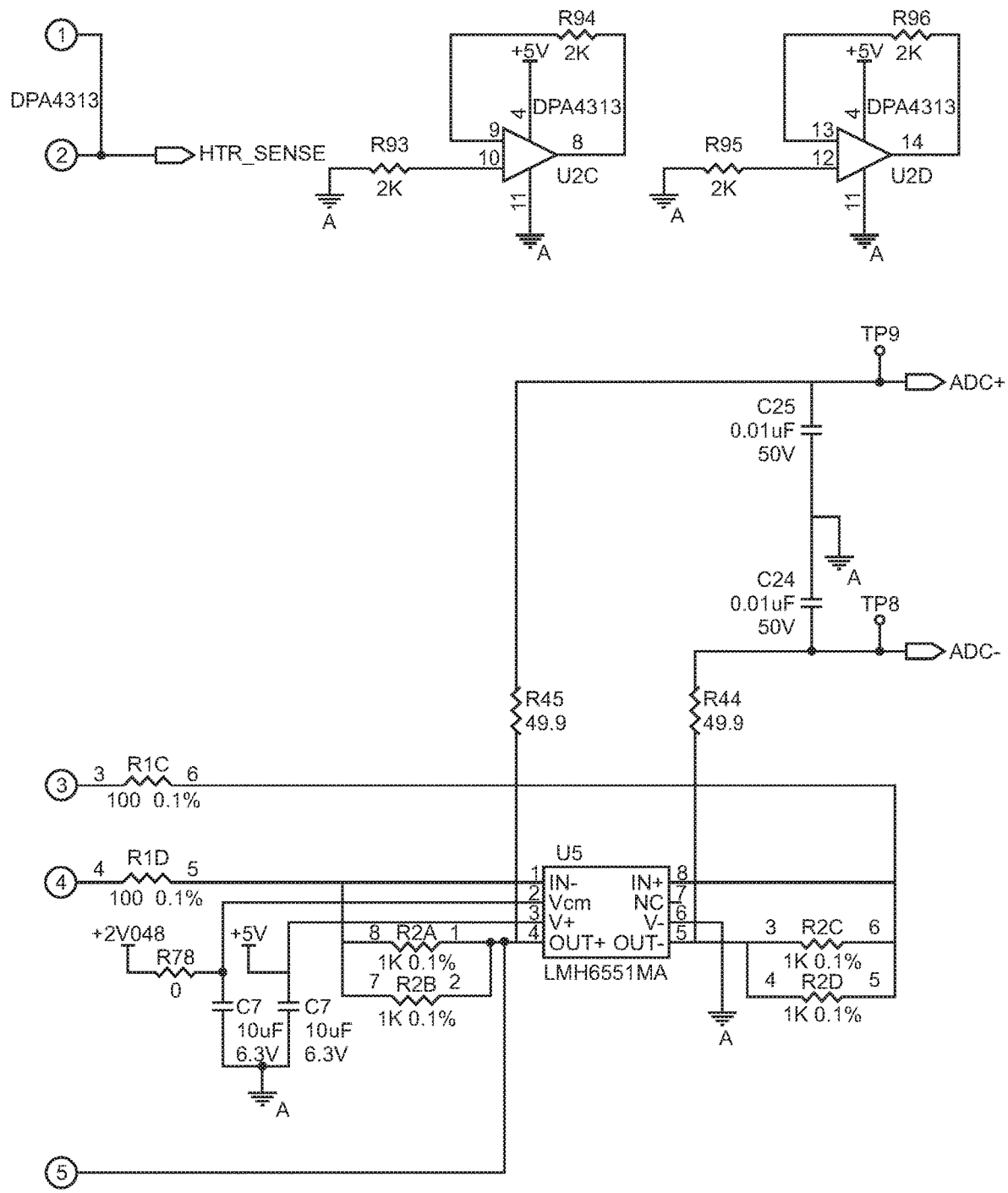

In FIG. 8B, U5 (LMH6551MA) is a Differential, High Speed Op Amp that amplifies the sensed heater current, with the gain of 5 set by R2C, R2D, R1C, R2A, R2B, R1D, and R1A and R1B of FIG. 8A.

Figure 9A:
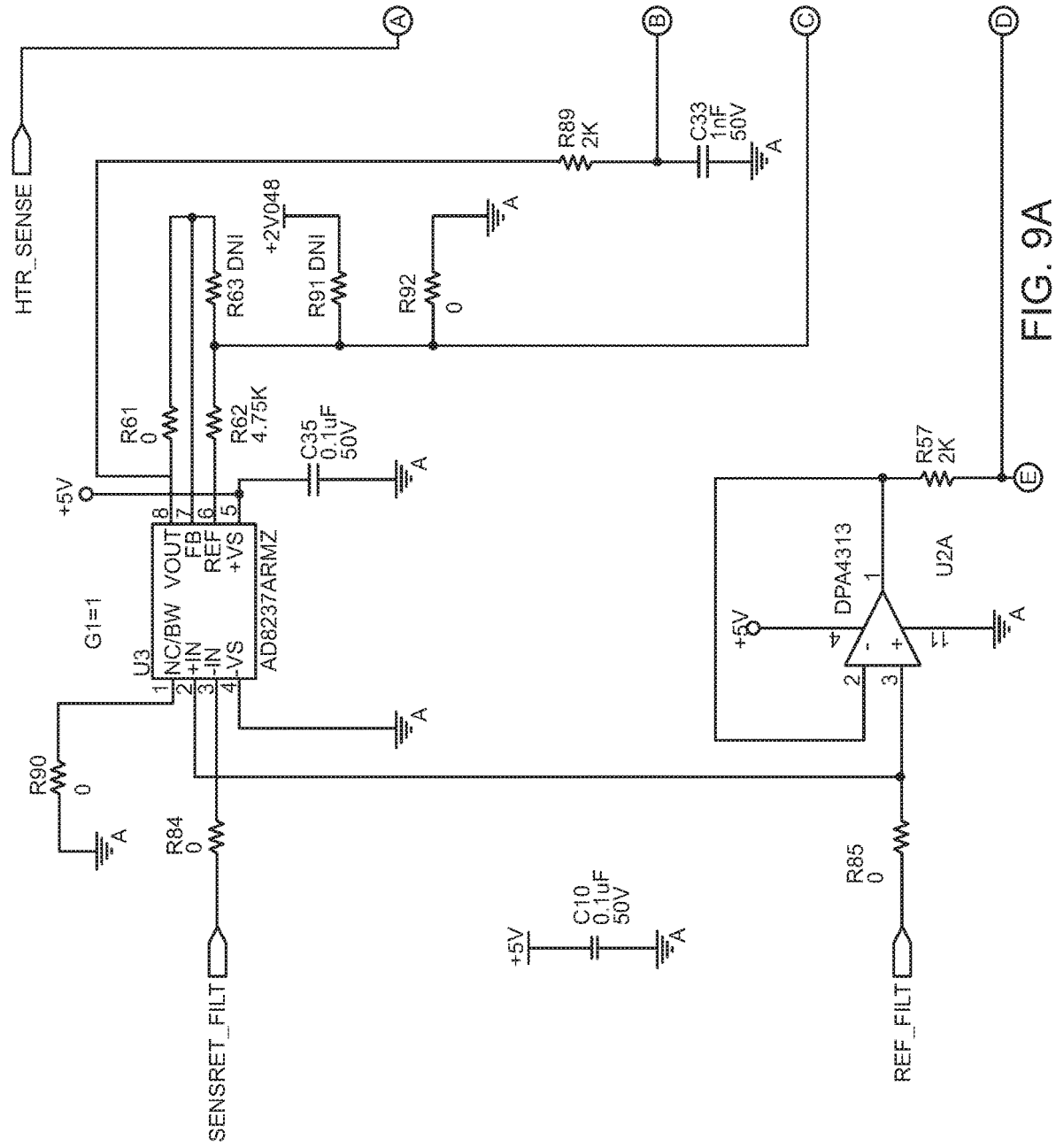
FIGS. 9A-9D comprise a combined circuit diagram of further details of the system.

With reference to FIG. 9A, U3 (AD8237ARMZ) is an instrumentation Amplifier used to amplify the voltage difference between REF_FILT signal and SENSRET_FILT signal, with the gain of 1. U2A (DPA4313) is a buffer for the REF_FILT signal.

Figure 9B:
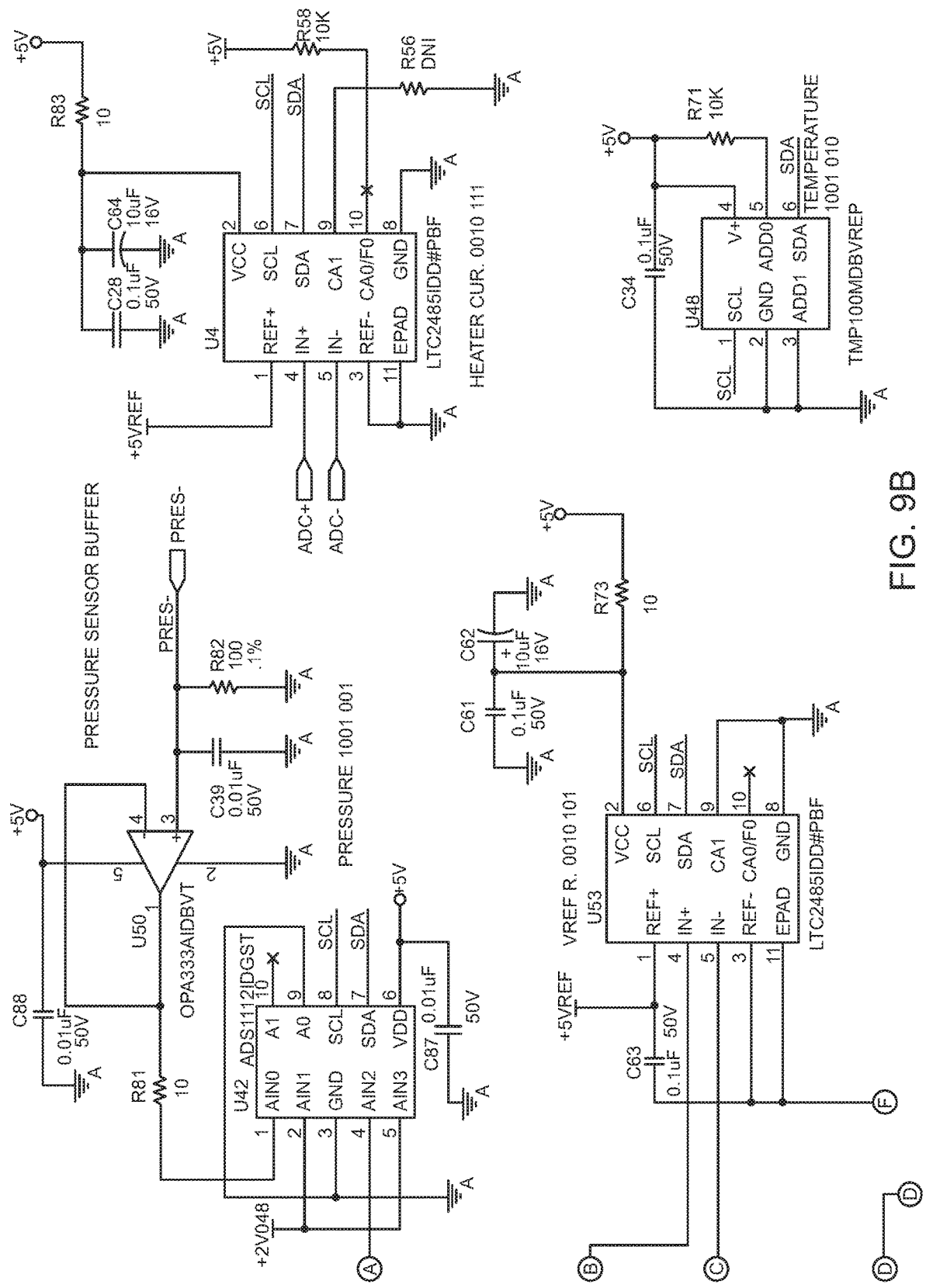

With reference to FIG. 9B, U42, U50, and associated components in the upper left of the drawing form the Pressure Input analog-to-digital data acquisition circuit; U42 (ADS1112IDGST) is a 16-bit analog-to-digital converter (ADC) and U50 (OPA333AIDBVT) is a buffer for the pressure input. U53 (LTC2485IDD #PBF) is a 24-bit ADC used to convert the analog signal of the Reference RTD into ADC counts for further processing by the embedded software. U4 (LTC2485IDD #PBF) is a 24-bit ADC used to convert the analog signal of heater current into ADC counts for further processing by the embedded software. And U48 (TMP100MDBVREP) is a 16-bit ADC Temperature Sensor used to monitor the temperature surrounding the FE AST Analog Board.

Figure 9C:
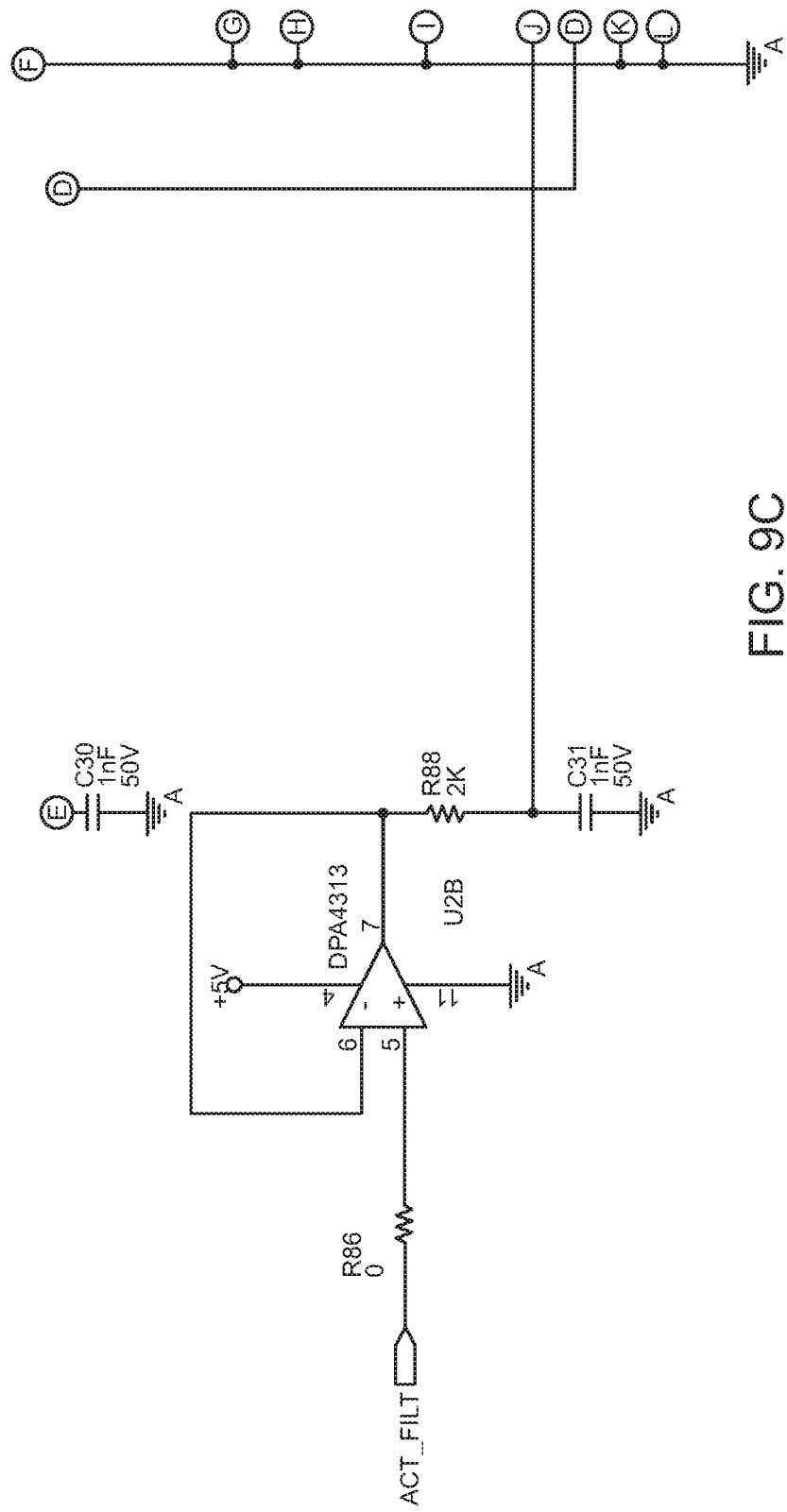

In FIG. 9C, U2B (DRA4313) is a buffer for the Active RTD.

Figure 9D:
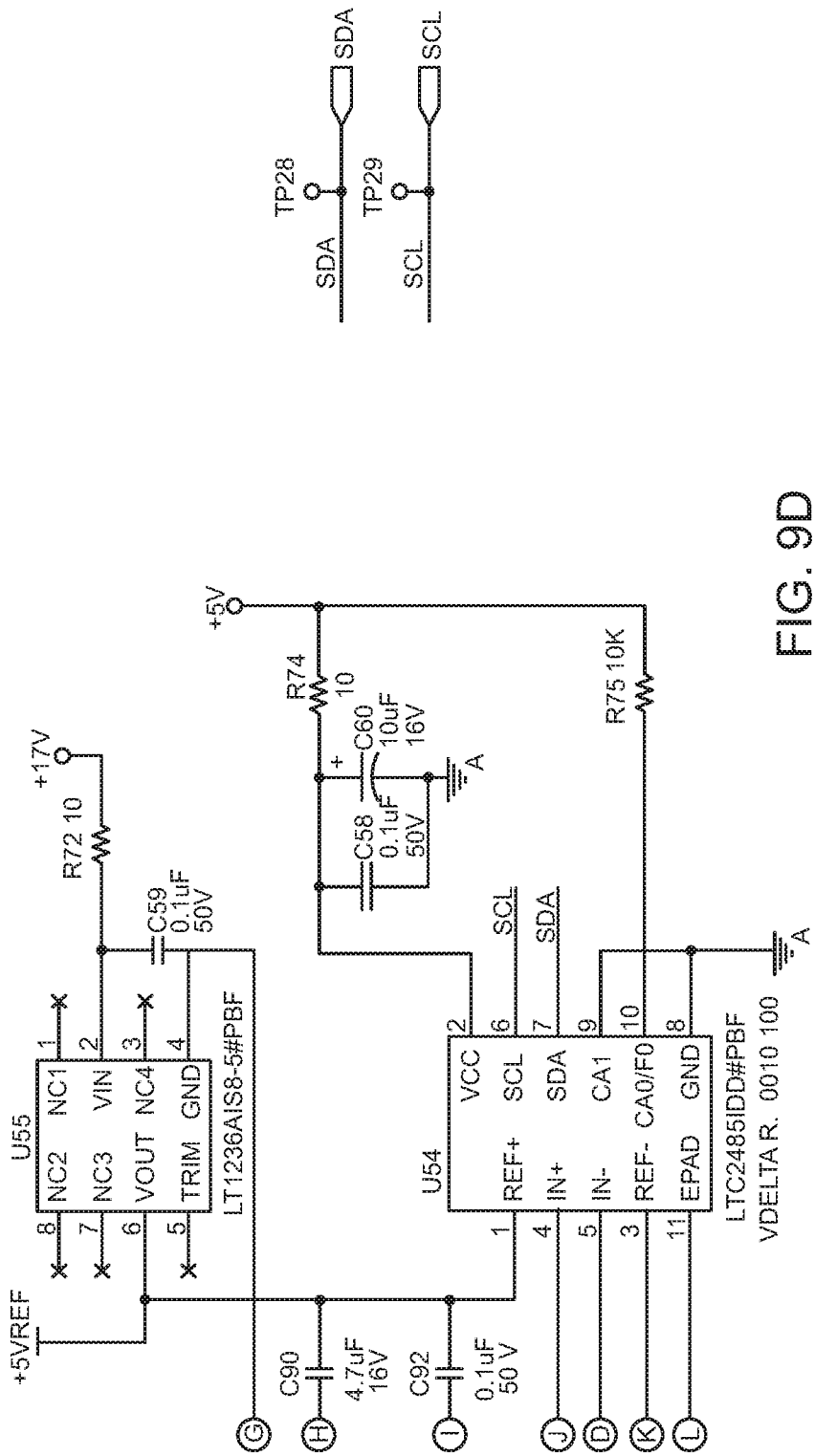

With reference to FIG. 9D, U55 (LT1236AIS8-5 #PBF) is a Precision Reference that takes the +17V input and regulates to a stable +5 VREF output. U54 (LTC2485IDD #PBF) is a 24-bit ADC used to convert the analog signal from the Delta-R (the voltage difference between Active RTD and Reference RTD) into ADC counts for further processing by the embedded software.

In FIG. 10A, U56 (upper), Q7, Q2, Q3, and their associated components form a voltage-to-current converter for excitation current for the Active RTD. And likewise, U56 (lower), Q5, Q6, Q4, and their associated components form a voltage-to-current converter for excitation current for the Reference RTD.

With reference to FIG. 10B, U51 (ADR01BRZ) is a 10V Voltage Reference that takes the +17V input and produce an output of 10 Volts, which in turn supplies U56 (upper) and U56 (lower) in FIG. 10A. U49 (OP777ARMZ) is a buffer for the 10 Volt output and supplies higher current capability to U56 (upper) and U56 (lower) in FIG. 10A.

The P1 block of FIG. 10C has already been discussed in the description of FIG. 6C.

The invention claimed is:

1. A mass flowmeter for fluid media, the mass flowmeter comprising:
    a reference, unheated sensor having an electrical excitation input and an output, said reference sensor detecting the temperature of the fluid media;
    an active, heated sensor having an electrical power input and an output, the thermal difference $\Delta T$ between the output from the reference sensor and the active sensor being continuously determined;
    a source of electrical power coupled to the heater of said active sensor;
    a controller which controls the power applied to the heater of said active sensor to selectively maintain $\Delta T$ constant, the power applied to the active sensor heater being below a predetermined level at start up and increasing in relationship to mass flow rate increases until the power applied as mass flow rate increases reaches the predetermined level, and maintains that power level as mass flow of the media continues to increase while $\Delta T$ diminishes, the power applied to the heater of the active sensor being continuously determined, the controller further controls the power applied to the heater of said active sensor to maintain the power level constant at the predetermined level as mass flow decreases until the power required to the heater of the active sensor drops below the predetermined level at which time the controller switches to the constant $\Delta T$ mode:
    and
    digital circuitry for determining the mass flow of the media as the electrical power is varied in relation to mass flow changes and for determining mass flow of the media as the $\Delta T$ changes in relation to mass flow changes when the electrical power applied to the heater of said active sensor is maintained at the predetermined level.

2. The mass flowmeter according to claim 1, wherein said controller uses a hardware-based closed-loop control circuit to control the power applied to the heater of said active sensor.

3. A method for measuring mass flow of a fluid using an apparatus comprising a reference, unheated sensor having an excitation input and an output, an active, heated sensor having an electrical power input and output, a source of electrical excitation to the reference sensor and a source of electrical power to the heater of the active sensor, the method comprising:

applying power to the active sensor heater below a predetermined level at start up;

maintaining the temperature differential ($\Delta T$) constant between the reference sensor heater and the active sensor as the fluid mass flow rate increases, by increasing the power to the active sensor heater up to the predetermined power level;

measuring the electrical power level as it increases in relation to increase in mass flow rate of the fluid;

determining the mass flow rate in relation to the power level applied to the heater of the heated sensor;

continuing to apply electrical power at the predetermined level to the heater of the active sensor;

measuring the $\Delta T$ as mass flow rate increases and the power level applied to the heater of the active sensor remains constant;

determining the mass flow in relation to $\Delta T$ changes as mass flow changes; and maintaining the power applied to the heater of the active sensor at the predetermined level until the mass flow rate of the fluid decreases until the power required to maintain $\Delta T$ constant drops below the predetermined level at which time the controller switches to the constant $\Delta T$ mode.

4. The method according to claim 3, and further comprising continuously measuring $\Delta T$ and the electrical power applied to the heater of the active sensor.

\* \* \* \* \*